US012391468B2

(12) United States Patent
Asmis et al.

(10) Patent No.: US 12,391,468 B2
(45) Date of Patent: Aug. 19, 2025

(54) TRASH RECEPTACLE LID SECURING DEVICE

(71) Applicant: Trash Can Buddy, LLC, Reno, NV (US)

(72) Inventors: Jamie Asmis, Reno, NV (US); Derek Asmis, Reno, NV (US)

(73) Assignee: Trash Can Buddy, LLC, Reno, NV (US)

( * ) Notice: Subject to any disclaimer, the term of this patent is extended or adjusted under 35 U.S.C. 154(b) by 176 days.

(21) Appl. No.: 18/378,622

(22) Filed: Oct. 10, 2023

(65) Prior Publication Data

US 2025/0115422 A1 Apr. 10, 2025

(51) Int. Cl.
*B65F 1/16* (2006.01)

(52) U.S. Cl.
CPC .............. *B65F 1/1615* (2013.01); *B65F 1/16* (2013.01); *B65F 2001/1653* (2013.01)

(58) Field of Classification Search
CPC ...... B65F 2001/1669; B65F 2001/1653; B65F 1/1615
See application file for complete search history.

(56) References Cited

U.S. PATENT DOCUMENTS

| | | | | |
|---|---|---|---|---|
| 3,102,661 | A * | 9/1963 | Lundquist | B65F 7/00 220/87.1 |
| 8,453,872 | B1 * | 6/2013 | Holmes | B65F 1/1473 220/759 |
| 9,126,730 | B1 * | 9/2015 | Lobdell | B65F 1/16 |
| 10,221,011 | B2 * | 3/2019 | Stone | E05B 65/006 |
| 12,280,944 | B2 * | 4/2025 | Forand | B65F 1/1646 |
| 2009/0050627 | A1 * | 2/2009 | Shinault | B65F 1/1615 220/315 |
| 2014/0076912 | A1 * | 3/2014 | Mattingly | B65F 1/1623 220/810 |
| 2019/0300281 | A1 * | 10/2019 | Strobl | B65F 1/1646 |
| 2023/0119933 | A1 * | 4/2023 | Costa Marques | B65F 1/1468 414/373 |

* cited by examiner

*Primary Examiner* — Mollie Impink
(74) *Attorney, Agent, or Firm* — Goodman Law Center, P.C.

(57) ABSTRACT

A device for substantially preventing opening of a trash receptacle lid includes, in some embodiments, a pair of clamps, a pair of brackets and a weighted element. The weighted element is configured to press against (exerting a force on) a hinged lid of the trash receptacle to substantially prevent inadvertent opening of the hinged lid, particularly during high winds and/or in the event that the trash receptacle is knocked over.

20 Claims, 8 Drawing Sheets

TRASH RECEPTACLE LID SECURING DEVICE

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of trash receptacles of existing art and more specifically relates to fastening means for trash receptacle lids.

RELATED ART

Wheeled trash receptacles are portable containers designed to hold and transport waste materials for efficient collection and disposal. These receptacles are typically equipped with a hinged lid, wheels, and a handle, which allow for easy maneuverability and transportation from households or businesses to designated collection points. Despite their convenience, these receptacles can encounter challenges when exposed to windy conditions. Particularly, strong gusts of wind can force open the lids of these receptacles, leading to the spillage of waste materials onto streets, sidewalks, or surrounding areas. In particularly forceful winds, the receptacles themselves can be tipped over, exacerbating the spillage issue and potentially causing litter to scatter.

Whilst some solutions have been employed to address the challenges posed by wind to wheeled trash receptacles, they are not without their limitations. For example, bungee cords or straps can provide a temporary fix by securing the lids of these receptacles and preventing them from being blown open by wind. However, they can be cumbersome to attach and remove, requiring extra effort and time when opening and closing the trash receptacle. Additionally, they might not fit all trash receptacles uniformly, leading to inconsistent results in securing the lids effectively. Accordingly, a suitable solution is desired.

SUMMARY OF THE INVENTION

In view of the foregoing disadvantages inherent in the known trash receptacle art, the present disclosure provides a novel trash receptacle lid securing device. The general purpose of the present disclosure, which will be described subsequently in greater detail, is to provide a device that can be used to weight down a lid of a trash receptacle and substantially prevent opening of the trash receptacle lid during high winds and/or in the event that the trash receptacle is knocked over.

A device for substantially preventing opening of a trash receptacle lid is disclosed herein. The device may be particularly used for trash receptacles with lids hinged to a handle shaft thereof. The device may include at least one clamp, at least one bracket and a weighted element. The at least one clamp may be configured to mount to and surround the handle shaft of the trash receptacle such that the device is able to pivot about the handle shaft between an in-use position and a not-in-use position. The at least one bracket extends from the at least one clamp and may particularly include a first arm attached to the at least one clamp and a second arm extending generally perpendicular from the first arm. The weighted element may be attached about the second arm of the at least one bracket and configured to press against a top surface of the trash receptacle lid when the device is in the in-use position and substantially prevent opening of the trash receptacle lid.

According to another embodiment, a refillable weight device for substantially preventing opening of a trash receptacle lid may be disclosed herein. The refillable weight device may include a pair of clamps, a pair of brackets and a weighted element. The pair of clamps may each be configured to mount to and surround the handle shaft of the trash receptacle such that the refillable weight device is able to pivot about the handle shaft between an in-use position and a not-in-use position. The pair of brackets may each include a first arm attached to and extending from one of the pair of clamps and a second arm extending generally perpendicular from the first arm.

The weighted element may include an elongated body having a rear end attached about each second arm of the pair of brackets, a front end opposite the rear end, a length therebetween, a hollow interior configured to receive a weight providing material to provide weight to the weighted element, an opening disposed in the front end thereof to provide access to the interior and enable filling thereof with the weight providing material, and a cap for sealing the opening. As above, the weighted element may be configured to press against a top surface of the trash receptacle lid when the refillable weight device is in the in-use position and substantially prevent opening of the trash receptacle lid.

According to another embodiment of the present disclosure, a method of substantially preventing opening of a trash receptacle lid is disclosed herein. The method may comprise the steps of: providing the device as above; mounting the at least one clamp to a handle shaft of the trash receptacle such that the at least one clamp surrounds the handle shaft and enables the device to pivot about the handle shaft between an in-use position and a not-in-use position; and placing the device into the in-use position, causing the weighted element to press against a top surface of the trash receptacle lid, substantially preventing opening thereof.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a trash receptacle lid securing device, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to trash receptacles and more particularly to a trash receptacle lid securing device. The trash receptacle lid securing device attaches to a wheeled trash receptacle having a hinged lid and includes a weight configured to press against the hinged lid of the trash receptacle to substantially prevent opening of the hinged lid. This particularly prevents windy conditions from opening the trash receptacle and/or causing the lid to open if the trash receptacle is knocked over in the wind.

Referring now more specifically to the drawings by numerals of reference, there is shown in FIGS. 1-7, various views of a device 100 for substantially preventing opening of a trash receptacle lid 6 ("device" 100). As shown in FIGS. 1-5 in particular and as discussed above, the device 100 may preferably be designed for use with a wheeled trash receptacle 5 having a lid 6 hinged to a handle shaft 7 of the trash receptacle 5.

Figure 1:
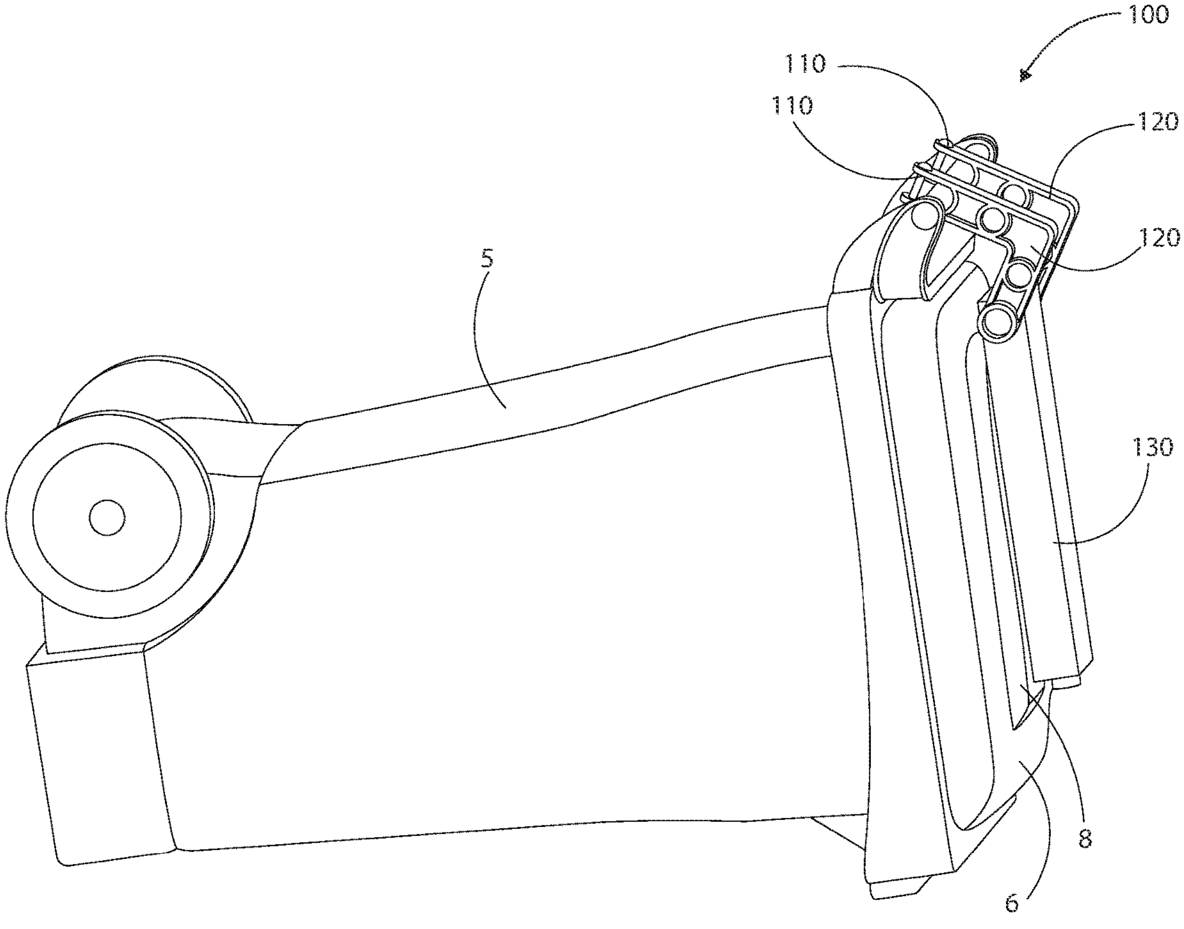
FIG. 1 is a side perspective view of a device attached to a lid of an overturned trash receptacle and being used to prevent opening of the lid, according to an embodiment of the disclosure.

Referring first to FIG. 1, there is shown the device 100 including at least one clamp 110, at least one bracket 120 and a weighted element 130. The device 100 is shown attached to a trash receptacle 5 that has been knocked over. The device 100, and more particularly the weighted element 130, is acting on the trash receptacle lid 6 to prevent the trash receptacle lid 6 from opening, and thus preventing the contents of the trash receptacle 5 from spilling.

Referring now more specifically to FIGS. 2-5, there is shown the device 100 attached to an upright trash receptacle 5. Particularly, as shown, the device 100 may include a pair of clamps 110 configured to mount to and surround the handle shaft 7 of the trash receptacle 5. This preferably may enable the device 100 to pivot about the handle shaft 7 and move the device 100 between an in-use position 102 and a not-in-use position 103.

Figure 2:
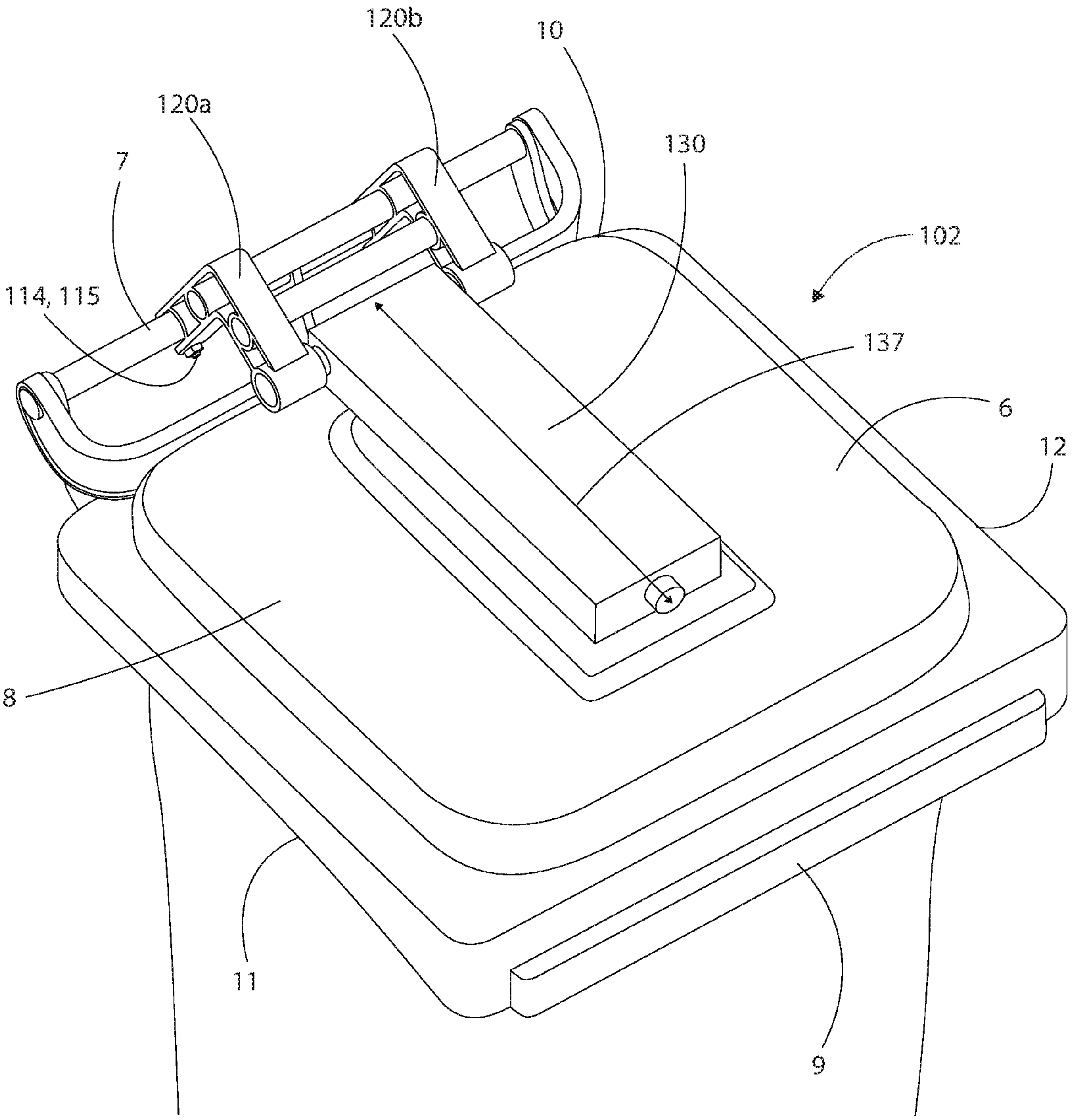
FIG. 2 is a front perspective view of the device attached to the lid and in an in-use position (preventing opening of the lid), according to an embodiment of the present disclosure.
Figure 3:
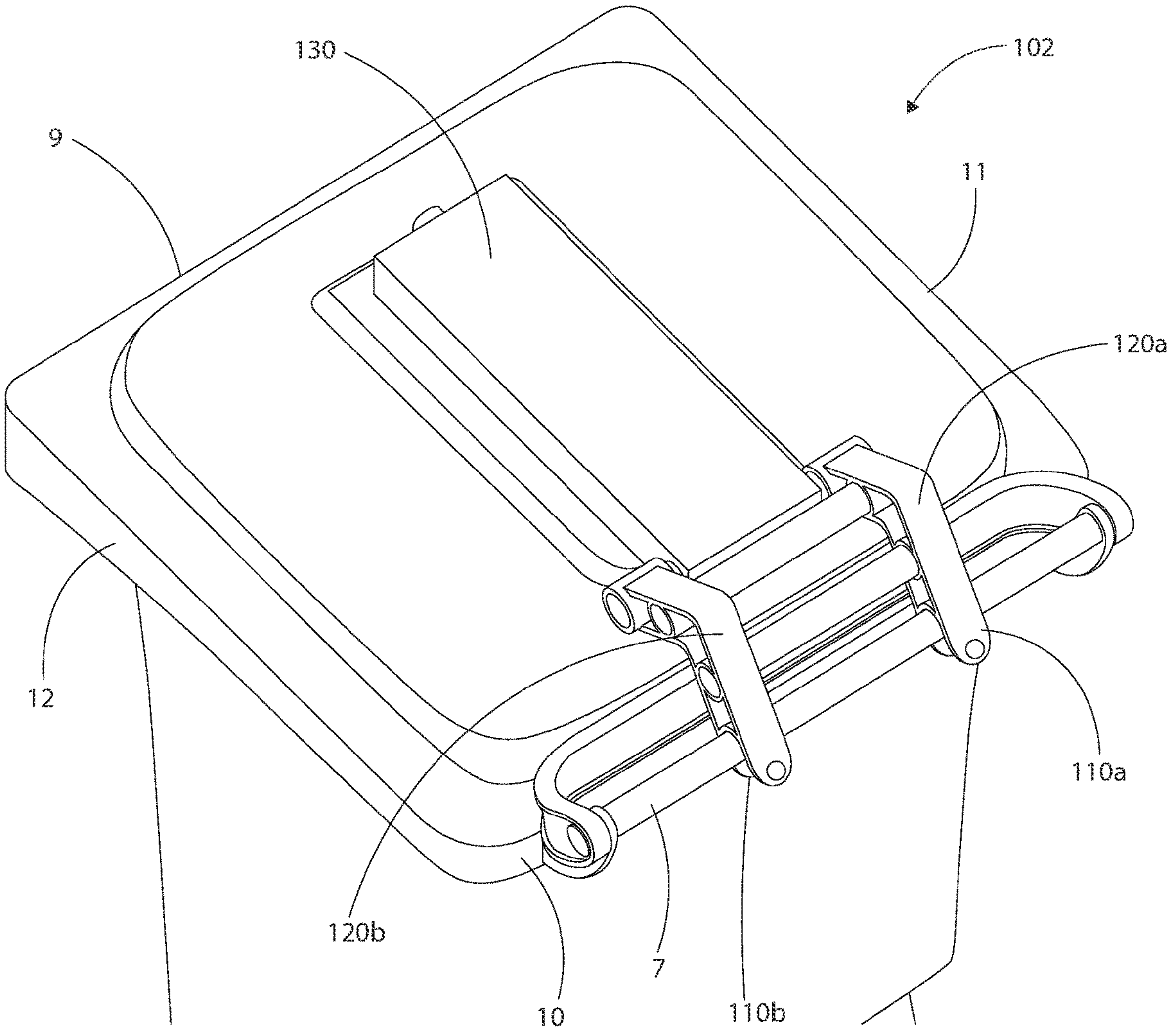
FIG. 3 is a rear perspective view of the device attached to the lid in the in-use position, according to an embodiment of the present disclosure.

FIGS. 2-3 (and FIG. 1) demonstrate the in-use position 102 of the device 100. As shown, in the in-use position 102, the device 100 is used to (substantially) prevent opening of the trash receptacle lid 6. Particularly, the weighted element 130 may be configured to press against (exert a downward force on) a top surface 8 of the trash receptacle lid 6 when the device 100 is in the in-use position 102. Further, as shown here, in the in-use position 102, the weighted element 130 may be horizontal relative to a ground surface, and a length 137 (or longitudinal axis) of the weighted element 130 may be oriented perpendicular to front and rear sides 9, 10 of the trash receptacle lid 6 and parallel to left and right sides 11, 12.

Figure 4:
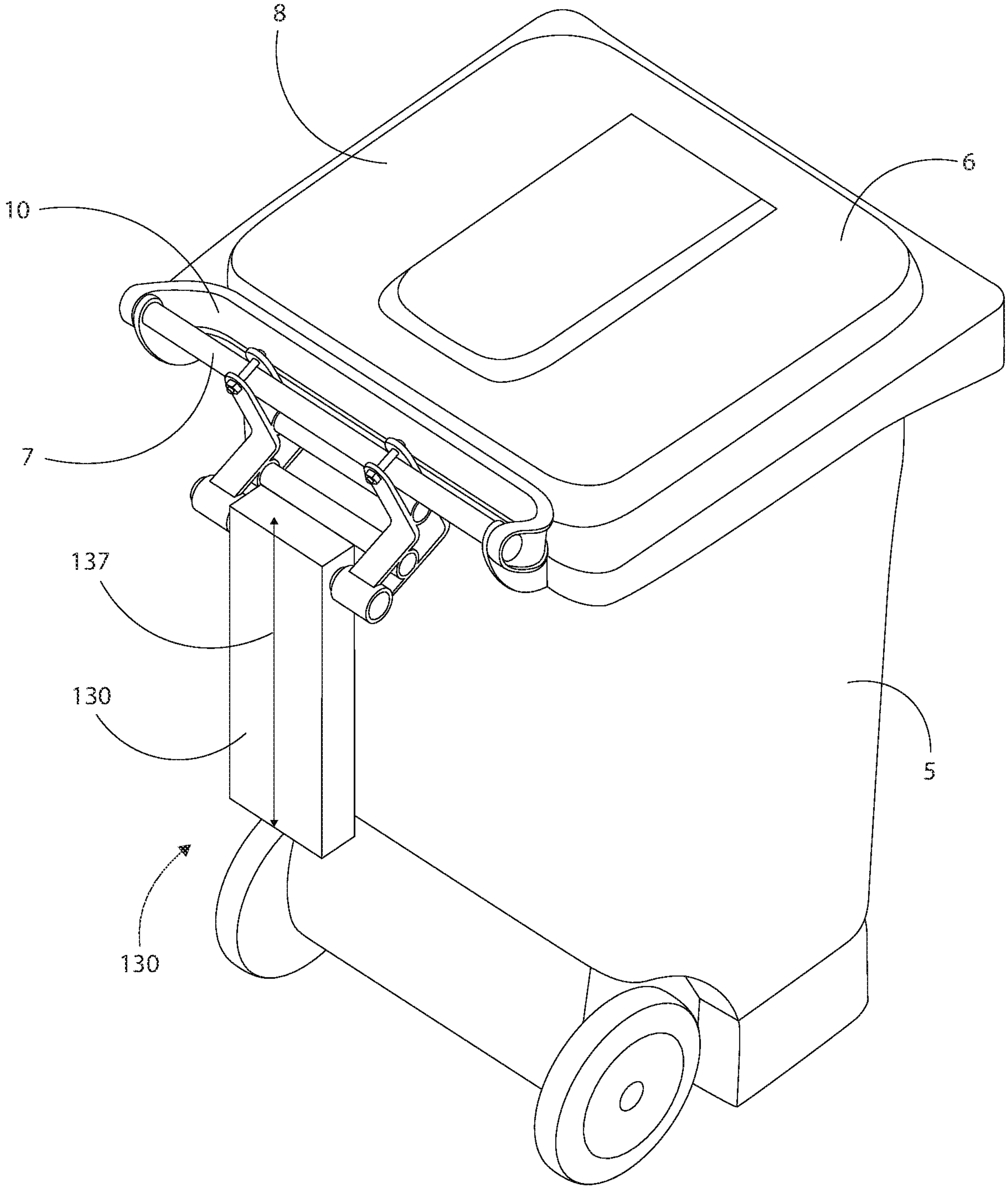
FIG. 4 is a rear perspective view of the device attached to the lid and in a not-in-use position (not preventing opening of the lid), according to an embodiment of the present disclosure.
Figure 5:
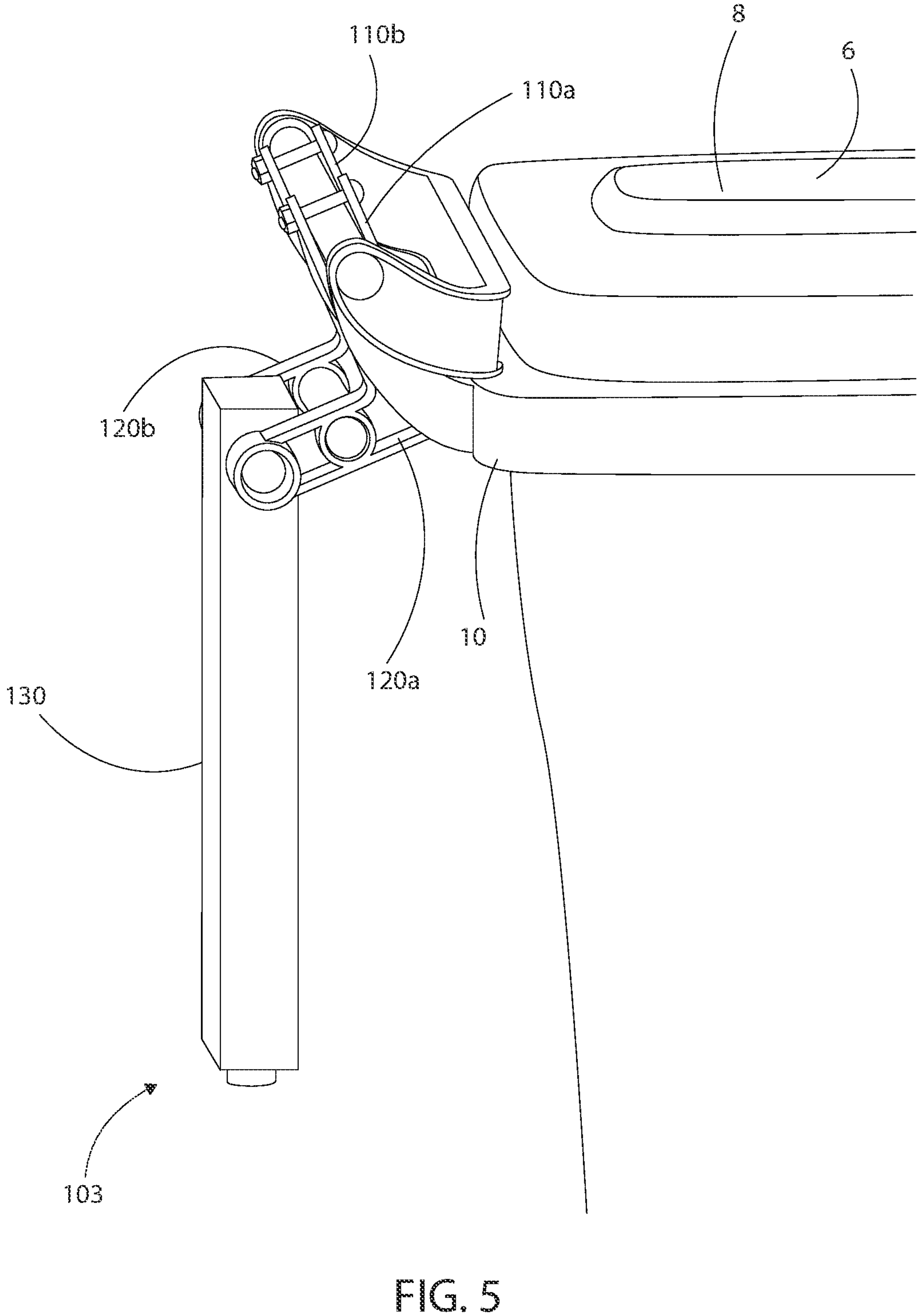
FIG. 5 is a side perspective view of the device attached to the lid in the not-in-use position, according to an embodiment of the present disclosure.

FIGS. 4-5 demonstrate the not-in-use position 103 of the device 100. As shown, in the not-in-use position 103, the device 100 may be held behind the trash receptacle 5 at the rear 10 thereof. Particularly, the weighted element 130 may be vertical relative to the ground surface and the length 137 of the weighted element 130 may be (generally) perpendicular to the top surface 8 of the trash receptacle lid 6.

Figure 6:
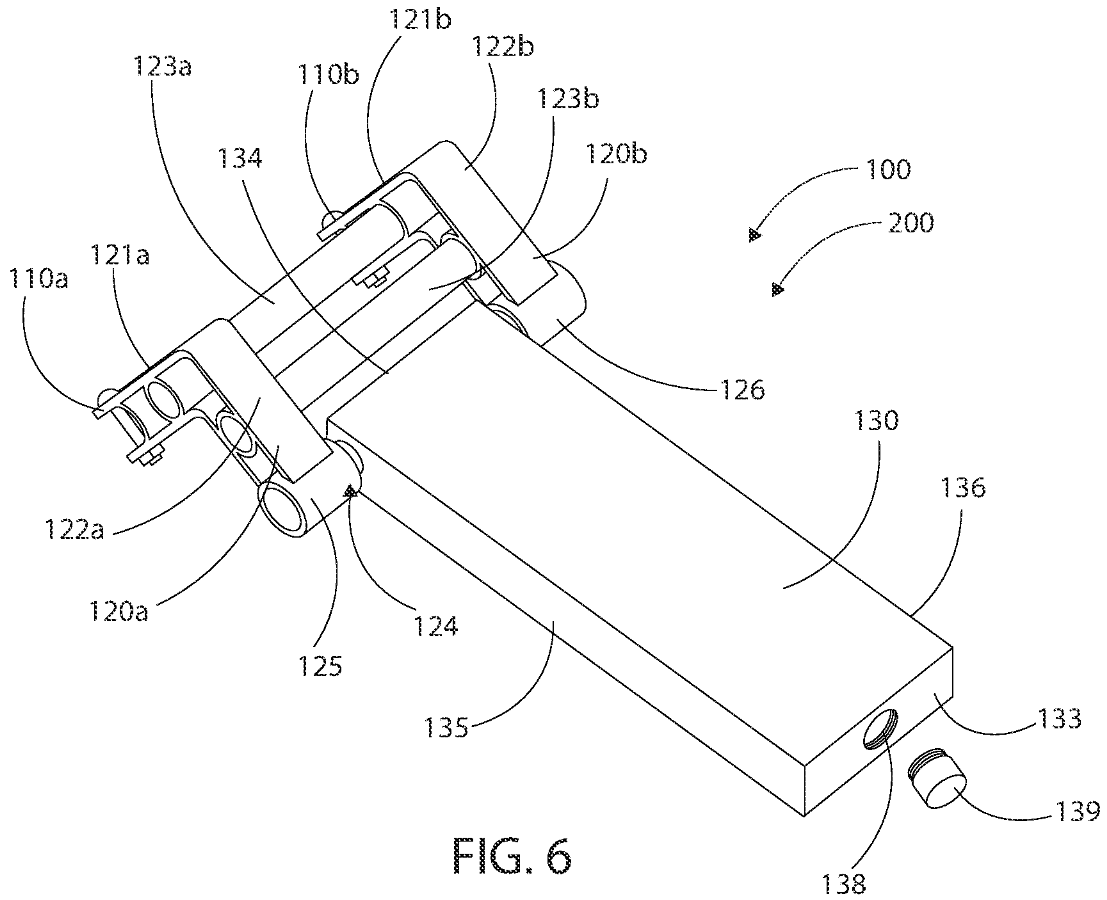
FIG. 6 is a top front perspective view of the device including a pair of clamps, a pair of brackets, and a weighted element, the weighted element including a hollow interior and an opening for enabling the weighted element to be filled with weight providing material, according to an embodiment of the present disclosure.
Figure 7:
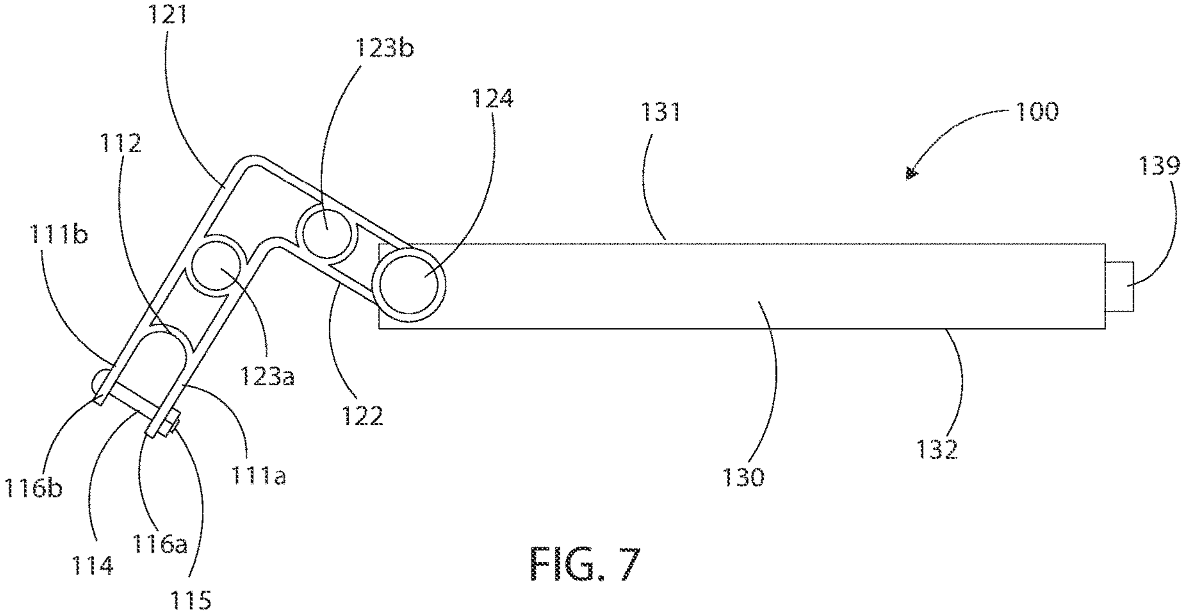
FIG. 7 is a side view of the device, according to an embodiment of the present disclosure.

Referring now more specifically to FIGS. 6-7 illustrating the device 100 not attached to the trash receptacle 5. As above and as shown here, the device 100 may include a pair of clamps 110 *a*, 110 *b*; a pair of brackets 120 *a*, 120 *b*; and the weighted element 130.

As shown best in FIG. 7, the pair of clamps 110 *a*, 110 *b* may include a U-shape. Particularly, the pair of clamps 110 *a*, 110 *b* may each include a pair of opposing arms 111 *a*, 111 *b* joined together at an arcuate end 112 of the clamps 110 *a*, 110 *b*. An end 116 *a*, 116 *b* of each of the pair of opposing arms 111 *a*, 111 *b* (the end opposite the arcuate end 112) may include a pair of aligned apertures (not illustrated) disposed therein and configured to receive a bolt 114 therethrough. In use, a user may place the clamps 110 *a*, 110 *b* over the handle shaft 7 of the trash receptacle 5, insert the bolt 114 through the aligned apertures and screw a nut 115 over the bolt 114 to secure the clamps 110 *a*, 110 *b* to the handle shaft 7.

As shown in FIGS. 6-7, one of the pair of brackets 120 *a*, 120 *b* may extend from one of the pair of clamps 110 *a*, 110 *b*. In some embodiments, as demonstrated in these figures, the pair of clamps 110 *a*, 110 *b* and the pair of brackets 120 *a*, 120 *b* may be of unitary construction.

As shown particularly in FIG. 6, the pair of brackets 120 *a*, 120 *b* may each include a first arm 121 *a*, 121 *b* attached to the pair of clamps 110 *a*, 110 *b* and a second arm 122 *a*, 122 *b* extending generally perpendicular from the first arm 121 *a*, 121 *b*. Particularly, as shown in these figures, in some embodiments the pair of brackets 120 *a*, 120 *b* may each be L-shaped. This shape may enable the pair of brackets 120 *a*, 120 *b* to universally accommodate a wide variety of trash receptacles 5. Further, the shape of the pair of brackets 120 *a*, 120 *b* may aid in prevention of the opening of the trash receptacle lid 6. For example, in the in-use position 102 (FIGS. 2-3), the second arm 122 *a*, 122 *b* of each of the pair of brackets 120 *a*, 120 *b* may extend downwardly into the trash receptacle lid 6, applying pressure to the top surface 8 of the trash receptacle lid 6.

In some embodiments, each of the brackets 120 *a*, 120 *b* further may include a pivot element 124 spanning between the second arm 122 *a*, 122 *b* of each of the brackets 120 *a*, 120 *b*. Particularly, the pivot element 124 may include a first pivot bar 125 attached to one of the second arms 122 *a* and a second pivot bar 126 attached to another of the second arms 122 *b*. In this embodiment, the weighted element 130 may be attached between the first and second pivot bars 125, 126 at the rear end 134 of the weighted element 130 and configured to pivot about the first and second pivot bars 125, 126. This may be particularly useful for collection of trash from the trash receptacle 5. For example, when the trash receptacle 5 is upside down and completely vertical (i.e., when being emptied by a trash collection truck), the weighted element 130 may pivot about the pivot element 124, allowing the trash receptacle lid 6 to open and the contents to be emptied. Once the trash receptacle 5 is turned upright (i.e., once let go from the trash collection truck), the weighted element 130 may then be able to return to the in-use position 102.

Further, as shown, the pair of brackets 120 *a*, 120 *b* may include two support shafts 123 *a*, 123 *b* extending between the pair of brackets 120 *a*, 120 *b* and providing support, and durability thereto. Particularly, one of the support shafts 123 *a* may be attached between each first arm 121 *a*, 121 *b* and another of the support shafts 123 *b* may be attached between each second arm 122 *a*, 122 *b*, at either side of an apex defined by the arms 121, 122.

As shown in FIGS. 6-7, the weighted element 130 may include an elongated (three-dimensional) rectangular shape having a top 131 opposite a bottom 132 (i.e., the side that contacts the top surface 8 of the trash receptacle lid 6 in the in-use position 102), a front end 133 opposite a rear end 134 (i.e., the end attached to the pair of brackets 120) and a left side 135 opposite a right side 136. In some embodiments, the device 100 may be a refillable weight device 200. As such, in this embodiment, the weighted element 130 may include a hollow interior configured to receive a weight providing material to provide weight to the weighted element 130. For example, the weight providing material may include (but is not limited to) water, sand, or the like (not illustrated). In this embodiment, the weight providing material may be easily drained from the weighted element 130 when not in use, to facilitate easier portability.

In addition to this, as particularly shown in FIG. 6, the weighted element 130 may include an opening 138 disposed in a side thereof, providing access to the hollow interior and enabling filling thereof with the weight providing material. For example, as shown here, the opening 138 may be disposed at the front end 133 of the weighted element 130. Further, as shown in FIG. 6, the weighted element 130 may comprise a cap 139 for sealing the opening 138. In some embodiments, the opening 138 and the cap 139 may be threaded. In other embodiments, the cap 139 may include a stopper for the sealing the opening 138. Other means of sealing the opening 138 are also contemplated.

In use, a user may attach the device 100 to the trash receptacle 5 by sliding the pair of clamps 110 over the handle shaft 7 of the trash receptacle 5, threading a bolt 114 through each of the aligned apertures in the pair of clamps 110 and screwing a nut 115 over each bolt 114. In some embodiments, the user may then remove the cap 139 from the weighted element 130, fill the hollow interior of the weighted element 130 with a weight providing material such as (but not limited to) water or sand, and re-seal the opening 138 in the weighted element 130 with the cap 139. The user may then pivot the device 100 to place the weighted element 130 over the trash receptacle lid 6, causing the weight from the weighted element 130 to press into (exert a downward force on) the top surface 8 of the trash receptacle lid 6 and substantially prevent opening of the trash receptacle lid 6.

Figure 8:
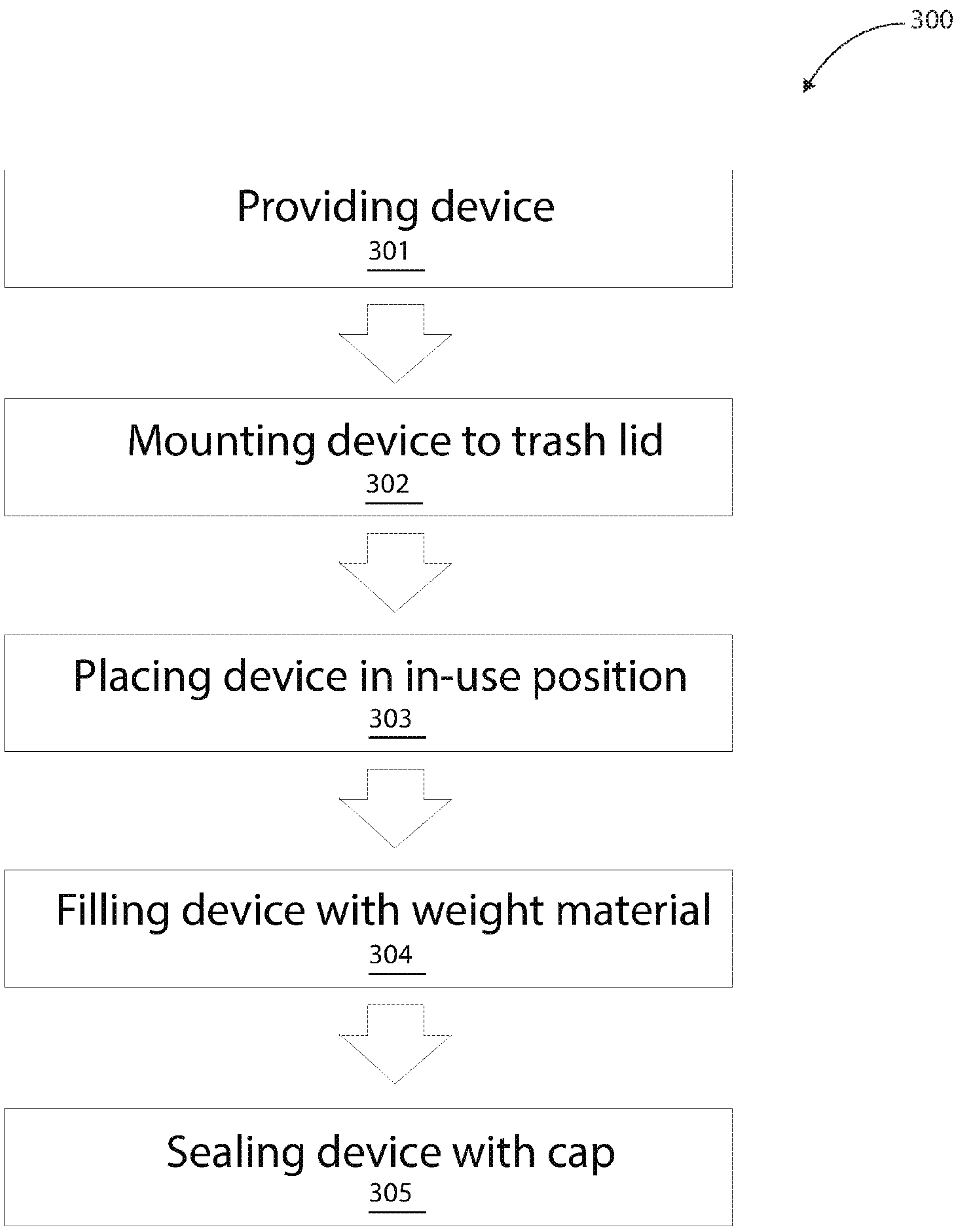
FIG. 8 is a flow diagram illustrating a method of substantially preventing opening of a trash receptacle lid, according to an embodiment of the present disclosure.

Referring now specifically to FIG. 8, there is shown a flow diagram depicting a method of substantially preventing opening of a trash receptacle lid, according to an embodiment of the present disclosure. In particular, the method 300 may include one or more components or features of the device 100 as described above. As demonstrated, the method 300 may include the steps of:

step one 301, providing the device as above; step two 302, mounting the at least one clamp to a handle shaft of the trash receptacle such that the at least one clamp surrounds the handle shaft and enables the device to pivot about the handle shaft between an in-use position and a not-in-use position; and step three 303, placing the device into the in-use position, causing the weighted element to press against (exert a downward force on) a top surface of the trash receptacle lid, substantially preventing opening thereof.

In embodiments wherein the weighted element is refillable and includes the hollow interior discussed above, the method may further comprise the steps of: step four 304, filling, via the opening, the hollow interior of the weighted element with weight providing material to provide weight to the weighted element; and step five 305, sealing the opening with the cap.

It should be noted that the steps described in the method 300 can be carried out in many different orders according to user preference. It should also be noted that, under appropriate circumstances, considering such issues as design preference, user preferences, marketing preferences, cost, structural requirements, available materials, technological advances, etc., other methods are taught herein.

In this specification and the drawings, some elements that have substantially the same function and structure are denoted with the same reference signs, some including the notations “a” and “b” to distinguish, and repeated explanation omitted. It should also be appreciated that common but well understood elements that are useful or necessary in a commercially feasible embodiment may not be depicted or discussed throughout in order to facilitate a clearer view of the various embodiments of the present invention.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the relevant patent office(s) and the public generally, and especially the scientist, engineers and practitioners in the art who are not familiar with patent or legal terms or phraseology, to determine quickly from a cursory inspection the nature and essence of the technical disclosure of the application.

What is claimed is:

1. A device for substantially preventing opening of a trash receptacle lid, the lid being hinged to a handle shaft of the trash receptacle, the device comprising:

a) at least one clamp configured to mount to and surround the handle shaft of the trash receptacle such that the device is able to pivot about the handle shaft between an in-use position and a not-in-use position;

b) at least one bracket extending from the at least one clamp, the at least one bracket including a first arm attached to the at least one clamp and a second arm extending generally perpendicular from the first arm; and c) a weighted element attached about the second arm of the at least one bracket, the weighted element configured to press against a top surface of the trash receptacle lid when the device is in the in-use position and substantially prevent opening of the trash receptacle lid.

2. The device of claim 1, wherein the at least one clamp is U-shaped, the at least one clamp including a pair of opposing arms joined together at an arcuate end of the at least one clamp, an end of each of the pair of opposing arms including a pair of aligned apertures disposed therein and configured to receive a bolt therethrough to secure the pair of clamps to the handle shaft of the trash receptacle.

3. The device of claim 2, wherein the at least one clamp includes a pair of clamps.

4. The device of claim 1, wherein the at least one bracket is L-shaped.

5. The device of claim 4, wherein the at least one bracket includes a pair of brackets.

6. The device of claim 5, wherein the pair of brackets include two support shafts extending therebetween, one of the two support shafts extending between each first arm of the pair of brackets, and another of the two support shafts extending between each second arm of the pair of brackets.

7. The device of claim 6, wherein the weighted element includes an elongated body having a front end opposite a rear end and a length therebetween, the rear end being attached about each second arm of the pair of brackets.

8. The device of claim 7, wherein the length of the weighted element is oriented perpendicular to front and rear sides of the trash receptacle lid and parallel to left and right sides of the trash receptacle lid when in the in-use position.

9. The device of claim 8, wherein the pair of brackets further include a pivot element attached about each second arm, and wherein the weighted element is pivotably attached to the pivot element.

10. The device of claim 9, wherein the weighted element includes a hollow interior configured to receive a weight providing material to provide weight to the weighted element.

11. The device of claim 10, wherein the weighted element includes an opening disposed in the front end thereof, the opening providing access to the hollow interior and enabling filling thereof with the weight providing material.

12. The device of claim 11, further comprising a cap for sealing the opening.

13. A refillable weight device for substantially preventing opening of a trash receptacle lid, the lid being hinged to a handle shaft of the trash receptacle, the refillable weight device comprising:

a) a pair of clamps each configured to mount to and surround the handle shaft of the trash receptacle such that the refillable weight device is able to pivot about the handle shaft between an in-use position and a not-in-use position;

b) a pair of brackets each including a first arm attached to and extending from one of the pair of clamps and a second arm extending generally perpendicular from the first arm; and c) a weighted element including an elongated body having a rear end attached about each second arm of the pair of brackets, a front end opposite the rear end, a length therebetween, a hollow interior configured to receive a weight providing material to provide weight to the weighted element, an opening disposed in the front end to provide access to the interior and enable filling with the weight providing material, and a cap for sealing the opening; and d) wherein the weighted element is configured to press against a top surface of the trash receptacle lid when the refillable weight device is in the in-use position and substantially prevent opening of the trash receptacle lid.

14. The refillable weight device of claim 13, wherein the pair of clamps are U-shaped, the pair of clamps each including a pair of opposing arms joined together at an arcuate end of each clamp, an end of each of the pair of opposing arms including a pair of aligned apertures disposed therein and configured to receive a bolt therethrough to secure the pair of clamps to the handle shaft of the trash receptacle.

15. The refillable weight device of claim 13, wherein the pair of brackets are L-shaped.

16. The refillable weight device of claim 15, wherein the pair of brackets include two support shafts extending therebetween, one of the two support shafts extending between each first arm of the pair of brackets, and another of the two support shafts extending between each second arm of the pair of brackets.

17. The refillable weight device of claim 16, wherein the length of the weighted element is oriented perpendicular to front and rear sides of the trash receptacle lid and parallel to left and right sides of the trash receptacle lid when in the in-use position.

18. The refillable weight device of claim 17, wherein the pair of brackets further include a pivot element attached about each second arm, and wherein the weighted element is pivotably attached to the pivot element.

19. A method of substantially preventing opening of a trash receptacle lid, the method comprising the steps of:

a) providing a device including:
   i. at least one clamp;
   ii. at least one bracket extending from the at least one clamp and including a first arm attached to the at least one clamp and a second arm extending generally perpendicular from the first arm; and
   iii. a weighted element attached about the second arm of the at least one bracket;

b) mounting the at least one clamp to a handle shaft of the trash receptacle such that the at least one clamp surrounds the handle shaft and enables the device to pivot about the handle shaft between an in-use position and a not-in-use position; and c) placing the device into the in-use position, causing the weighted element to press against a top surface of the trash receptacle lid, substantially preventing opening thereof.

20. The method of claim 19, wherein the weighted element includes a hollow interior, an opening providing access to the hollow interior, and a cap for sealing the opening, and wherein the method further comprises the steps of:

a) filling, via the opening, the hollow interior of the weighted element with weight providing material to provide weight to the weighted element; and b) sealing the opening with the cap.

* * * * *